(12) United States Patent
Spatafora

(10) Patent No.: US 7,143,889 B2
(45) Date of Patent: Dec. 5, 2006

(54) VARIABLE-CAPACITY STORE

(75) Inventor: Mario Spatafora, Bologna (IT)

(73) Assignee: G.D. Societa' per Azioni, Bologna (IT)

( * ) Notice: Subject to any disclaimer, the term of this patent is extended or adjusted under 35 U.S.C. 154(b) by 121 days.

(21) Appl. No.: 10/490,083

(22) PCT Filed: Sep. 20, 2002

(86) PCT No.: PCT/IT02/00601

§ 371 (c)(1),
(2), (4) Date: Sep. 10, 2004

(87) PCT Pub. No.: WO03/024255

PCT Pub. Date: Mar. 27, 2003

(65) Prior Publication Data

US 2005/0006201 A1   Jan. 13, 2005

(30) Foreign Application Priority Data

Sep. 20, 2001 (IT) .......................... BO2001A0568

(51) Int. Cl.
*B65G 21/18* (2006.01)

(52) U.S. Cl. .................... 198/347.1; 198/778
(58) Field of Classification Search ............. 198/347.1, 198/347.2, 347.3, 457.03, 778
See application file for complete search history.

(56) References Cited

U.S. PATENT DOCUMENTS

| | | | | |
|---|---|---|---|---|
| 3,348,659 A | * | 10/1967 | Roinestad ................... 198/778 |
| 4,273,233 A | * | 6/1981 | Hinchcliffe et al. ....... 198/347.3 |
| 4,365,702 A | * | 12/1982 | Tolasch et al. ........... 198/347.3 |
| 5,103,960 A | * | 4/1992 | Brown et al. ............ 198/347.1 |
| 5,398,521 A | | 3/1995 | Baron et al. |
| 5,577,594 A | * | 11/1996 | Belvederi ................. 198/347.3 |
| 6,065,585 A | * | 5/2000 | Bryant et al. ............ 198/347.1 |
| 6,422,380 B1 | * | 7/2002 | Sikora ........................ 198/812 |
| 2003/0173185 A1 | * | 9/2003 | Hammock et al. ....... 198/347.1 |

FOREIGN PATENT DOCUMENTS

EP          0 738 478 A     10/1996

\* cited by examiner

*Primary Examiner*—Patrick Mackey
*Assistant Examiner*—Mark A. Deuble
(74) *Attorney, Agent, or Firm*—Ladas & Parry LLP

(57) ABSTRACT

A variable-capacity store (1) for objects (2), wherein an endless powered flexible conveyor belt (12) defines a conveying branch (6) for transferring a mass of objects (2) from an input station (S1) to an output station (S2), and defines a return branch (9) extending from the output station (S2) to the input station (S1); the conveying branch (6) is located entirely above a horizontal storage plane (13), and the store (1) is connected to at least one vertical conveyor (14) located at the input station (S1) and/or the output station (S2) to lift/lower the mass of objects (2) to/from the horizontal storage plane (13), and which is at least partly defined by an up/down branch (16) of the flexible belt (12).

10 Claims, 2 Drawing Sheets

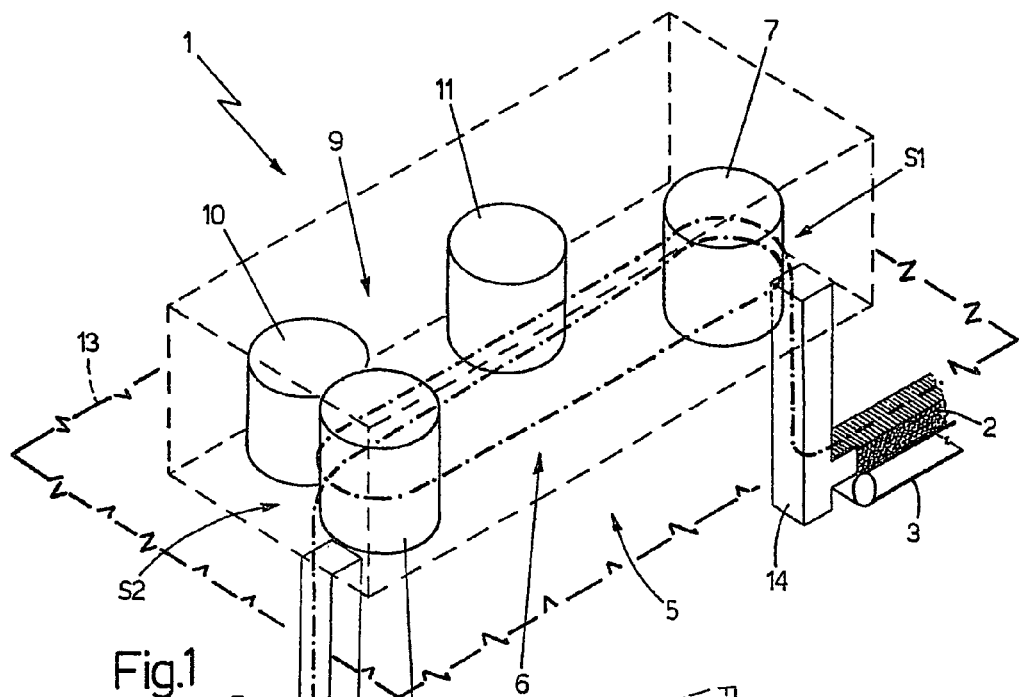
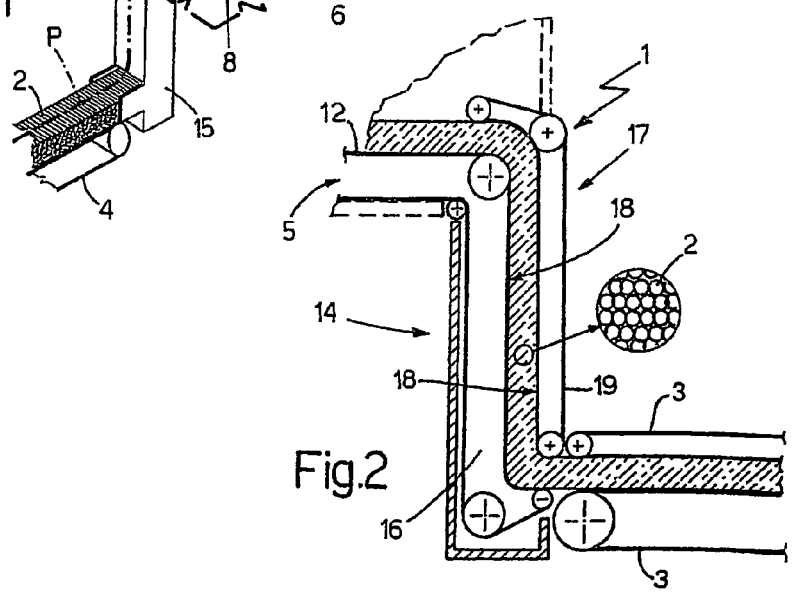
Fig.1
Fig.2

VARIABLE-CAPACITY STORE

TECHNICAL FIELD

The present invention relates to a variable-capacity store.

The present invention may be used to advantage for storing cigarettes, to which the following description refers purely by way of example.

BACKGROUND ART

In cigarette manufacturing and packing plants, a variable-capacity store, of the type described for example in Patent Application EP0738478, is interposed between a cigarette manufacturing machine and a packing machine to compensate for any difference between the number of cigarettes produced and the number of cigarettes packed.

The store described in Patent Application EP0738478 is a variable-capacity FIFO (First In First Out) store, i.e. in which the cigarettes fed first into the store are also the first to be fed out, so as to prevent the cigarettes from being parked too long in the store and so possibly losing their aroma.

More specifically, the store described in Patent Application EP0738478 comprises an input station and an output station arranged in series along a cigarette feed path; and an endless conveyor comprising a conveying branch, for conveying the cigarettes along the path, and a return branch, which respectively define a first and second coil of given lengths about respective pairs of drums. In use, the cigarettes are fed from the input station to the output station by the conveying branch, and a regulating member adjusts the lengths of the two branches in complementary manner to adjust the overall capacity of the store.

Variable-capacity stores of the type described above have proved practical, are therefore used widely in cigarette manufacturing and packing plants, and, being of considerable size but light in weight, are normally installed a given height (at least three meters) off the floor to make the best use of available floor space. Being installed so high off the floor, however, connecting the stores to an input conveyor (supplying the cigarettes to the input station) and/or to an output conveyor (receiving the cigarettes from the output station) can prove relatively complicated and expensive by calling for special vertical conveyors at the input and output stations to lift/lower the mass of cigarettes to/from the store.

DISCLOSURE OF THE INVENTION

It is an object of the present invention to provide a variable-capacity store designed to eliminate the aforementioned drawbacks, and which in particular is cheap and easy to implement.

According to the present invention, there is provided a variable-capacity store for objects and comprising an endless powered flexible conveyor belt, which defines a conveying branch for transferring a mass of objects from an input station to an output station, and defines a return branch extending from the output station to the input station; the input station and the output station being located entirely above a horizontal storage plane, and the store being connected to at least one vertical conveyor located at the input or output station to lift/lower the mass of objects to/from the horizontal storage plane; the store being characterized in that, at the input or output station, the flexible belt comprises a respective up/down branch, wherein the flexible belt extends downwards below the horizontal storage plane to define at least one portion of the vertical conveyor.

BRIEF DESCRIPTION OF THE DRAWINGS

A non-limiting embodiment of the present invention will be described by way of example with reference to the accompanying drawings, in which:

FIG. 1 shows a schematic view in perspective of a cigarette store in accordance with the present invention;

FIG. 2 shows a partly sectioned side view of a vertical conveyor of the FIG. 1 store;

BEST MODE FOR CARRYING OUT THE INVENTION

Figure 3:
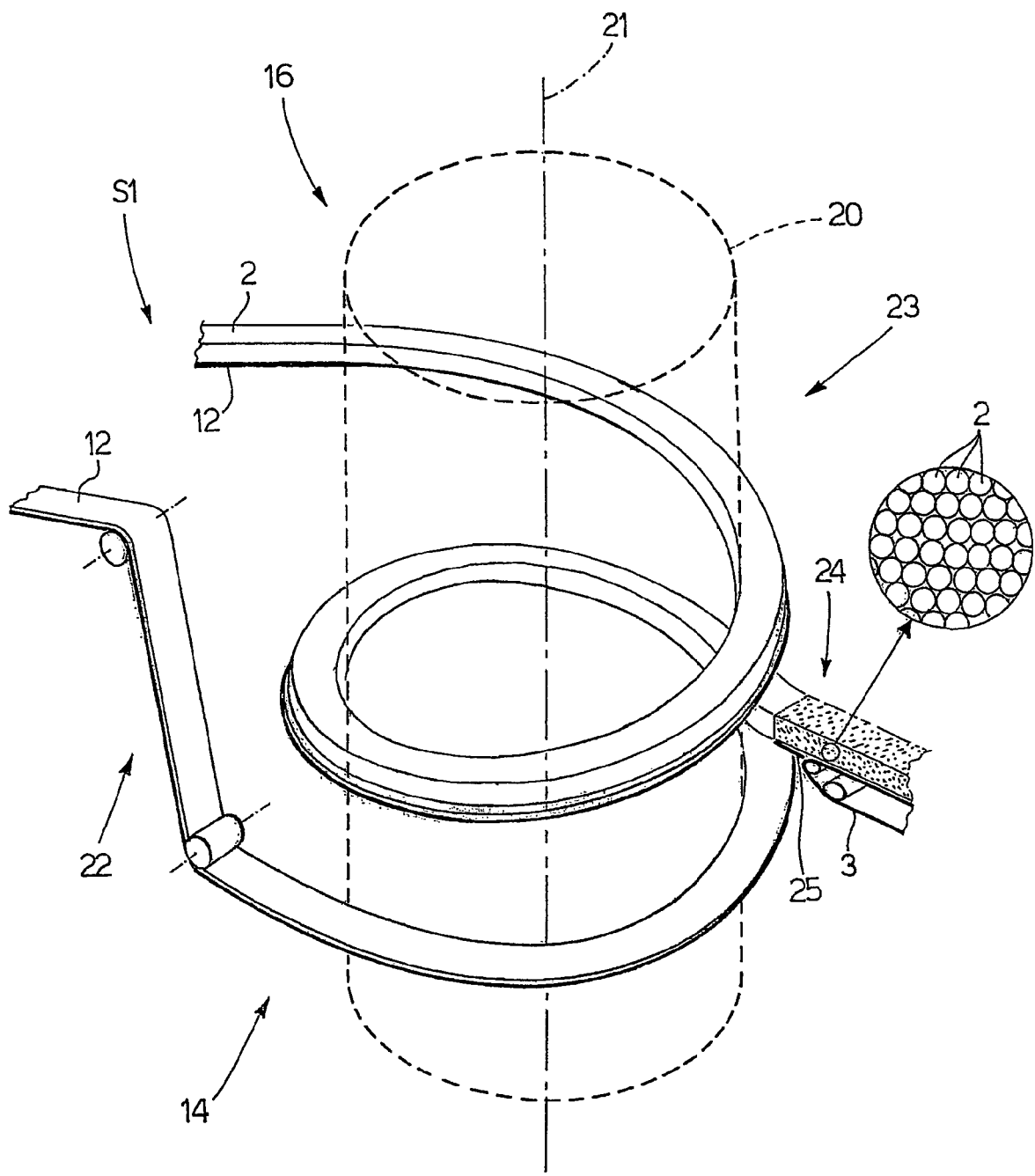
FIG. 3 shows a schematic view in perspective of a different embodiment of the vertical conveyor in FIG. 2.

Number 1 in FIG. 1 indicates as a whole a variable-capacity FIFO (First In First Out) store for cigarettes 2, i.e. wherein the first cigarettes 2 to be fed into store 1 are also the first cigarettes 2 to be fed out of store 1. Store 1 comprises an input station S1 and an output station S2 arranged in series along a feed path P of cigarettes 2; input station S1 receives a mass of cigarettes 2 in a continuous stream from an output conveyor 3 of a manufacturing machine (not shown); and output station S2 feeds a mass of cigarettes 2 in a continuous stream to an input conveyor 4 of a packing machine (not shown).

Store 1 also comprises an endless conveyor 5 in turn comprising a conveying branch 6, which is substantially horizontal (i.e. slopes by no more than 20° with respect to the horizontal), extends between a drum 7, close to input station S1, and a drum 8, close to output station S2, and feeds cigarettes 2 from input station S1 to output station S2; and a return branch 9 extending between a drum 10, close to output station S2, and a drum 11, close to input station S1.

Conveyor 5 comprises a flexible belt 12 (shown in FIG. 2) extending about a number of known transmission pulleys (not shown for the sake of simplicity), some of which are powered to impart motion to belt 12; and belt 12 also winds in respective coils about drums 7 and 8 (conveying branch 6) and about drums 10 and 11 (return branch 9).

Store 1 also comprises a known regulating unit (not shown) for adjusting the length L1 of conveying branch 6 and the length L2 of return branch 9 in complementary manner, so as to adjust the storage capacity of store 1. More specifically, the positions of drums 8 and 10 are fixed, and the regulating unit moves drums 7 and 11 with respect to respective drums 8 and 10 by the same amount but in opposite directions.

When drum 7 is moved closer to drum 8, the storage capacity of store 1 is reduced by shortening conveying branch 6 wound about drums 7 and 8; and the surplus flexible belt 12 must obviously be absorbed by lengthening return branch 9, which is done by moving drum 11 away from drum 10 by the same amount but in the opposite direction to that in which drum 7 is moved closer to drum 8.

Similarly, when drum 7 is moved away from drum 8, the storage capacity of store 1 is increased by lengthening conveying branch 6 wound about drums 7 and 8; and the extra flexible belt 12 must obviously be supplied by shortening return branch 9, which is done by moving drum 11 closer to drum 10 by the same amount but in the opposite direction to that in which drum 7 is moved away from drum 8.

Store 1 is installed relatively high off the floor (normally over 3 meters), so that both conveying branch 6 and return branch 9 are located entirely above a horizontal storage plane 13, while conveyors 3 and 4 are located below horizontal storage plane 13; and, at input station S1 and output station S2, store 1 is connected to respective vertical conveyors 14 and 15 for lifting/lowering the mass of cigarettes 2 to/from horizontal storage plane 13.

As shown in FIG. 2, at input station S1, flexible belt 12 comprises an up/down branch 16 wherein flexible belt 12 is vertical and extends vertically downwards below horizontal storage plane 13 to define a portion of respective vertical conveyor 14. In a different embodiment not shown, flexible belt 12 comprises two up/down branches 16 defining a portion of respective vertical conveyors 14, 15 at respective input and output stations S1, S2.

Vertical conveyor 14 at input station S1 comprises a rectangular-section vertical duct 17 defined by four vertical walls 18, one of which is defined by the up/down branch 16 of flexible belt 12, the vertical wall 18 opposite and facing up/down branch 16 is defined by a further powered endless conveyor belt 19 synchronized with flexible belt 12, and the other two vertical walls 18 are defined by respective fixed flat elements not shown. The further conveyor belt 19 is preferably powered by deriving motion directly from flexible belt 12. In a different embodiment not shown, one vertical wall 18 is defined by the up/down branch 16 of flexible belt 12, and the other vertical walls 18 are defined by respective fixed flat elements. Preferably, as shown in FIG. 2, the up/down branch 16 of flexible belt 12 terminates with a short horizontal portion for connection to horizontal conveyor 3.

In the alternative embodiment shown in FIG. 3, the up/down branch 16 of flexible belt 12 defines conveyor 14 at input station S1 by coiling about a drum 20 with a vertical axis 21. More specifically, at input station S1, flexible belt 12 comprises a portion 22 wherein flexible belt 12 extends vertically downwards below horizontal storage plane 13 and onto a level with horizontal conveyor 3; and a portion 23 wherein flexible belt 12 coils about drum 20 and up over horizontal storage plane 13. At a transfer station 24, horizontal conveyor 3 is connected to portion 23 of flexible belt 12 by a bridge 25 to transfer the mass of cigarettes 2 on horizontal conveyor 3 to flexible belt 12. The FIG. 3 embodiment is preferably also used to form conveyor 15 at output station S2 of store 1.

In actual use, the mass of cigarettes 2 on horizontal conveyor 3 is transferred to portion 23 of flexible belt 12 at transfer station 24, and is then fed up over horizontal storage plane 13 and through input station S1 of store 1 by the movement of flexible belt 12.

The FIG. 3 embodiment has the advantage of feeding the mass of cigarettes 2 up over horizontal storage plane 13 along a spiral, as opposed to vertical, path, thus reducing the mechanical stress on, and therefore possible damage to, cigarettes 2.

In actual use, cigarettes 2 are fed continuously from conveyor 3 to input station S1 and onto conveying branch 6, and are fed by conveying branch 6 to output station S2 where the cigarettes 2 fed first into store 1 are fed onto conveyor 4.

In normal operating conditions, the number of cigarettes 2 fed by conveyor 3 to input station S1 equals the number of cigarettes 2 absorbed by conveyor 4 at output station S2; and, in the event the number of cigarettes 2 fed to input station S1 differs from the number of cigarettes 2 absorbed at output station S2, the known regulating unit (not shown) moves drums 7 and 11 with respect to corresponding drums 8 and 10 to adjust the storage capacity of store 1 and so compensate for the difference in the number of cigarettes 2 fed to input station S1 and the number of cigarettes 2 absorbed at output station S2.

Store 1 is therefore connected cheaply and easily to conveyors 3 and 4, by respective vertical conveyors 14 and 15 being substantially constructed using the up/down branches 16 of flexible belt 12.

The invention claimed is:

1. A variable-capacity store for objects and comprising an endless powered flexible conveyor belt (12), which defines a conveying branch (6) for transferring a mass of objects (2) from an input station (S1) to an output station (S2), and further defines a return branch (9) extending from the output station (S2) to the input station (S1);

the conveying branch (6) having a length (L1) and the return branch (9) having a length (L2), the lengths (L1 and L2) being adjusted in complementary manner, to adjust storage capacity of the store (1);

the input station (S1) and the output station (S2) located entirely above a horizontal storage plane (13), and the store (1) including at least one vertical conveyor (14; 15) located at the input or output station (S1; S2) to lift/lower the mass of objects (2) to/from the horizontal storage plane (13);

at the input or output station (S1; S2) the flexible belt (12) comprises a respective up/down branch (16), wherein the flexible belt (12) extends downwards below the horizontal storage plane (13) to define at least one portion of the vertical conveyor (14; 15).

2. A store as claimed in claim 1, wherein said up/down branch (16) of the flexible belt (12) terminates with a horizontal portion for connection to a horizontal conveyor (3) of the objects (2).

3. A store as claimed in claim 1, and including two said vertical conveyors (14, 15) located at the input and output stations (S1, S2) to lift/lower the mass of objects (2) to/from the horizontal storage plane (13); at the input and output stations (S1, S2), the flexible belt (12) comprising two respective up/down branches (16), wherein the flexible belt (12) is vertical and extends downwards below the horizontal storage plane (13) to define at least one portion of the respective vertical conveyors (14,15).

4. A store as claimed in claim 1, wherein said vertical conveyor (14; 15) comprises a vertical duct (17) which is rectangular in section and defined by four vertical walls (18), a first of which is defined by said up/down branch (16) of the flexible belt (12).

5. A store as claimed in claim 4, wherein two other second vertical walls (18) are defined by respective fixed flat elements (19), while a third vertical wall (18) facing and opposite said up/down branch (16) of the flexible belt (12) is defined by a further endless powered conveyor belt (19) synchronized with the flexible belt (12).

6. A store as claimed in claim 5, wherein said further conveyor belt (19) is powered by deriving motion from said flexible belt (12).

7. A store as claimed in claim 1, wherein said vertical conveyor (14; 15) is defined by the up/down branch (16) of the flexible belt (12), which winds around a drum (20) having a vertical axis (21).

8. A store as claimed in claim 7, wherein, at the input or output station (S1; S2), the up/down branch (16) of the flexible belt (12) comprises a first portion (22) wherein the flexible belt (12) extends vertically downwards below the horizontal storage plane (13), and a second portion (23)

wherein the flexible belt (12) winds around the drum (20) and up over the horizontal storage plane (13).

9. A store as claimed in claim 8, wherein the second portion (23) of the flexible belt (12) is connected to a horizontal conveyor (3) of the objects (2) by a bridge (25).

10. A store as claimed in claim 1, wherein said conveying branch (6) extends between a first input drum (7) and a second output drum (8), and the return branch (9) extends between a third input drum (10) and a fourth output drum (11); said second and said third drums (8,10) being located in fixed positions; and said first and said fourth drums (7,11) being movable by the same amount but in opposite directions with respect to the corresponding second and drums (8,10).

\* \* \* \* \*

UNITED STATES PATENT AND TRADEMARK OFFICE
CERTIFICATE OF CORRECTION

PATENT NO. : 7,143,889 B2
APPLICATION NO. : 10/490083
DATED : December 5, 2006
INVENTOR(S) : Mario Spatafora It is certified that error appears in the above-identified patent and that said Letters Patent is hereby corrected as shown below:

On title page, item 73, "D." should read -- D --.

Signed and Sealed this

Twentieth Day of March, 2007

JON W. DUDAS
*Director of the United States Patent and Trademark Office*